United States Patent [19]

Yagisawa et al.

[11] Patent Number: 5,353,063
[45] Date of Patent: Oct. 4, 1994

[54] METHOD AND APPARATUS FOR PROCESSING AND/OR DISPLAYING IMAGE DATA BASED ON CONTROL DATA RECEIVED WITH THE IMAGE DATA

[75] Inventors: Toshihiro Yagisawa, Yokohama; Ikuo Watanabe, Kawasaki; Motokazu Kashida, Musashino; Nobuhiro Hoshi, Yokohama, all of Japan

[73] Assignee: Canon Kabushiki Kaisha, Tokyo, Japan

[21] Appl. No.: 176,507

[22] Filed: Jan. 3, 1994

Related U.S. Application Data

[63] Continuation of Ser. No. 679,287, Apr. 2, 1991, abandoned.

[30] Foreign Application Priority Data

Apr. 4, 1990 [JP] Japan .................................. 2-88182
Apr. 4, 1990 [JP] Japan .................................. 2-88183

[51] Int. Cl.$^5$ ....................... H04N 1/41; H04N 1/417; H04N 7/15; H04N 5/44
[52] U.S. Cl. ..................... 348/426; 348/384; 348/432; 348/586; 348/716; 348/19; 348/415; 348/571
[58] Field of Search ............... 348/384, 426, 432, 586, 348/588, 584, 589, 598, 600, 571, 716, 715, 714, 722, 563, 565, 567, 553, 399, 409, 412, 415, 430, 460, 474, 473, 476, 390, 15, 17, 14, 18, 19, 431, 438, 439; H04N 5/262, 5/272, 9/74, 7/15, 7/14, 1/417, 1/41, 1/21, 5/44

[56] References Cited

U.S. PATENT DOCUMENTS

| | | | |
|---|---|---|---|
| 4,007,486 | 2/1977 | Inaba et al. | 358/13 |
| 4,231,063 | 10/1980 | Ito et al. | 358/148 |
| 4,388,645 | 6/1983 | Cox et al. | 358/147 |
| 4,470,079 | 9/1984 | Tsuruta | 360/10.2 |
| 4,613,908 | 9/1986 | Takahashi et al. | 358/310 |
| 4,614,979 | 9/1986 | Sugiyama et al. | 358/335 |
| 4,641,255 | 2/1987 | Hohmann | 364/522 |
| 4,680,629 | 7/1987 | Fukushima et al. | 358/147 |
| 4,698,676 | 10/1987 | Kubota et al. | 358/140 |
| 4,698,682 | 10/1987 | Astle | 358/182 |
| 4,768,095 | 8/1988 | Wada et al. | 358/183 |
| 4,791,489 | 12/1988 | Palatnick | 358/160 |
| 4,816,915 | 3/1989 | Imai et al. | 358/183 |
| 4,862,269 | 8/1989 | Sonoda et al. | 358/160 |
| 4,888,795 | 12/1989 | Ando et al. | 348/19 X |
| 4,982,283 | 1/1991 | Acampora | 358/160 |
| 5,014,128 | 5/1991 | Chen | 358/160 |
| 5,047,857 | 9/1991 | Duffield et al. | 358/183 |
| 5,130,801 | 7/1992 | Yamaguchi | 348/15 |
| 5,185,665 | 2/1993 | Okura et al. | 358/183 |

FOREIGN PATENT DOCUMENTS

| | | | |
|---|---|---|---|
| 54-023421 | 2/1979 | Japan | 358/183 |
| 2098021 | 11/1982 | United Kingdom | H04N 5/783 |

*Primary Examiner*—James J. Groody
*Assistant Examiner*—Safet Metjahic

[57] ABSTRACT

In an image display method and apparatus for displaying image data, it is determined, based upon a control code contained in received image data, whether the image data is whole image data in one frame or partial image data in one frame. When it is determined that the image data is partial image data, the content of a memory being displayed is transferred to another memory, and the partial image data is stored in the memory which is the destination of the transfer. When the transfer of the data to the memory which is the destination of the transfer ends, the content of this memory is read and displayed.

13 Claims, 10 Drawing Sheets

| DISPLAY FRAME | CONTENT OF FRAME MEMORY 103 | CONTENT OF FRAME MEMORY 104 | FRAME MEMORY CONTROL |
|---|---|---|---|
| 41 | | | STARTING TIME |
| 42 | | | WRITE FULL FRAME |
| 43 | | | TRANSFER FRAME DISPLAY BETWEEN FRAMES |
| 44 | | 51 | WRITE PARTIAL IMAGE |
| 45 | | | TRANSFER FRAME DISPLAY BETWEEN FRAMES |
| 46 | 52 | | WRITE PARTIAL IMAGE |
| 47 | | | DISPLAY FRAME |
| ? | ? | ? | END |

METHOD AND APPARATUS FOR PROCESSING AND/OR DISPLAYING IMAGE DATA BASED ON CONTROL DATA RECEIVED WITH THE IMAGE DATA

This application is a continuation of application Ser. No. 07/679,287 filed Apr. 2, 1991, now abandoned.

BACKGROUND OF THE INVENTION

1. Field of the Invention

This invention relates to an image display method and apparatus, an image processing method and apparatus for receiving, reproducing and displaying image information.

2. Description of the Prior Art

Still-picture transmission apparatus utilizing a high-definition television signal have recently been developed. In comparison with the signal used in the present NTSC broadcast television system, the aforementioned high-definition television signal (referred to as an HDTV signal) possesses more than five times as much image information and can provide a fine image with life-like appearance presence since the screen in the HDTV system is wider.

However, since the HDTV signal possesses a great amount of information, even in the case of still pictures, the signal is compressed (coded) by a compressive coding method owing to limitations upon the frequency of broadcast radio waves and communication capacity. Such coding makes it possible to transmit a large quantity of image signals even in a narrow transmission band (or at a low transmission rate). Specifically, in a case where a viewer observes a single still picture for several seconds to several tens of seconds, it has been contemplated to execute transmission at a bit rate of 2 Mbps.

However, the image data transmitted by such an image transmission apparatus represents a still picture, not a moving one. Such an apparatus is incapable of transmitting an image signal which requires the far greater amount of image data involved in a moving picture.

Figure 5:
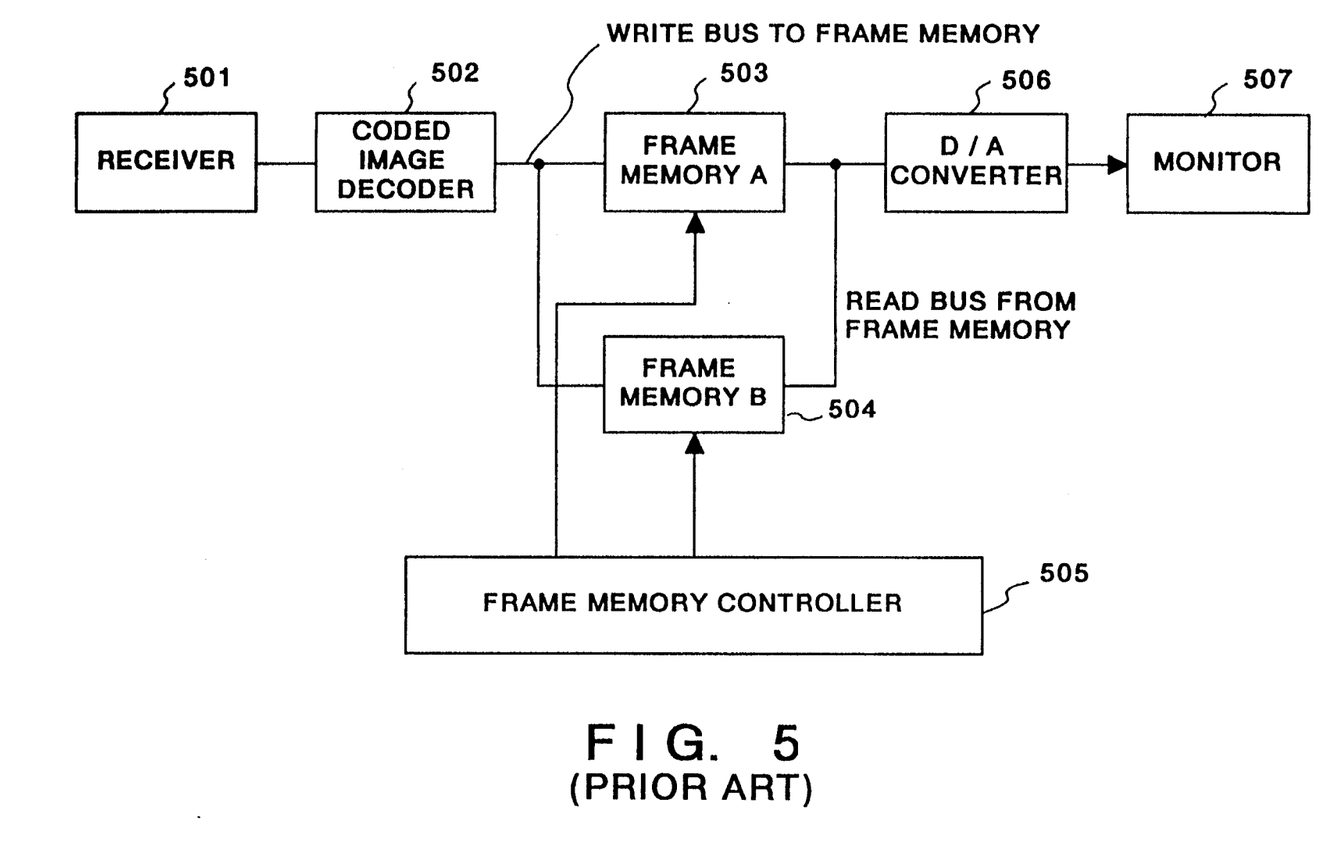
FIG. 5 is a block diagram illustrating the simplified construction of a still-picture playback apparatus according to the prior art.

FIG. 5 illustrates the construction of an image receiving/playback apparatus such as a conventional still-picture receiving/playback apparatus, television conference system or television telephone, etc. As shown in FIG. 5, image information which enters from a satellite broadcast line or communication line is converted into a digital image signal by a receiver 501, and the digital signal is sequentially decoded by a coded image decoder 502 to be expanded and restored to the original image data. When one frame of the image data thus decoded is written in a frame memory on a side not currently being used in presenting a display, the content of the frame memory in which this image data has just been written is read out in response to an instruction from the transmitting signal. The image information thus read out of the frame memory designated on the display side is converted into an analog signal by a D/A converter 506, and the analog signal is outputted to a monitor 507, with a synchronizing signal affixed thereto, to be displayed on the screen of the monitor.

In general, when image information received and successively decoded is written in a frame memory on the display side, the following problems occur:

(1) Contention develops among the read timings of the display system.

(2) A difficulty arises when it is attempted to avoid contention between writing and reading in the frame memory by using a multi-port DRAM or the like for the frame memory. Specifically, if the arrangement is such that received image data is newly written in a frame memory whose stored data is being displayed, the display gradually changes from one edge thereof as the writing operation proceeds. The result is a temporarily unattractive picture.

Accordingly, an expedient commonly adopted is to provide at least two frame memories, one for storing image information currently being displayed and the other for storing image information received and decoded. After a complete image has been played back and written in the frame memory on the write side, the frame memory in which the image has been written is switched over to the display side to display its data. Another expedient is to switch the frame memory within the vertical retrace interval, thereby preventing unattractive horizontal lines from appearing momentarily on the screen.

However, the still-picture playback apparatus exemplified by the prior described above plays back only still pictures and is incapable of playing back images as moving pictures.

SUMMARY OF THE INVENTION

Accordingly, an object of the present invention is to provide an image display method and apparatus adapted so as to be capable of rewriting a part of still-picture data, thereby making it possible to reproduce a moving picture using still-picture information.

According to the present invention, an image display apparatus which attains the foregoing object is for receiving and displaying image data and comprises image storing means constituted by a plurality of memories each capable of storing at least one frame of image data, display means for selecting a memory from the plurality of memories of the image storing means, reading out the content of this memory and displaying the content, discriminating means for discriminating, based upon a control code contained in the received image data, whether the image data is all of the image data in one frame or partial image data in one frame, and transfer means for transferring the received image data to a memory whose content is not being displayed by the display means when the discriminating means discriminates that the image data is all of the image data in one frame.

Another object of the present invention is to provide an image display method and apparatus in which a certain part of one frame is adopted as a moving-picture part and this moving-picture part is transmitted as still-picture information, whereby an image can be displayed and played back as a partial moving picture.

According to the present invention, an image display method which attains the foregoing object is for receiving, playing back and displaying image data and comprises a step of discriminating whether the received image data is stationary-picture data or moving-picture data based upon control data contained in the received image data, a step of storing received stationary-picture data in a frame memory and storing received moving-picture data in a moving-picture memory, and a step of reading and displaying stationary-picture data of a frame memory designated by the control data and moving-picture data stored in the memory, in accordance with display area information of moving-picture data with respect to the still-picture data designated by the control data, and display time of the moving-picture data.

Another object of the present invention is to provide an image processing method and apparatus having novel functions.

Another object of the present invention is to provide an image processing method and apparatus adapted so as to be capable of processing a pseudo moving picture in a simple construction.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 1:
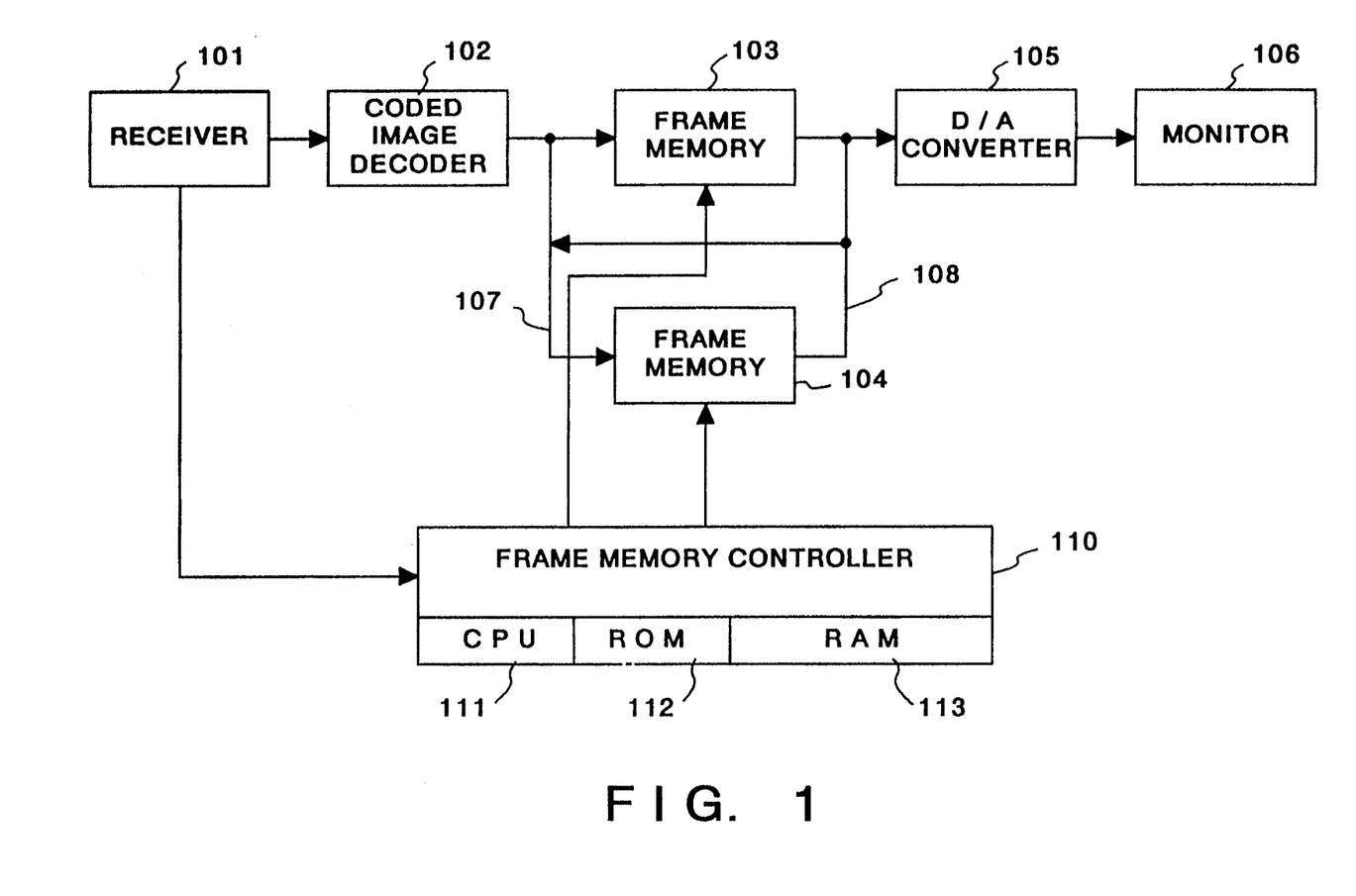
FIG. 1 is a block diagram illustrating the simplified construction of a still-picture playback apparatus according to an embodiment of the present invention.

FIG. 1 is a block diagram illustrating the simplified construction of a still-picture playback apparatus according to an embodiment of the present invention. With the exception of a receiver 101 and a frame memory controller 110, the other components are basically the same as those in the conventional still-picture playback apparatus shown in FIG. 5.

In FIG. 1, coded image data VD, which is contained in received data (shown in FIG. 2) inputted to the receiver 101, is delivered to a coded image decoder 102, where the data is restored to the original image data. Image control data contained in the received image data is delivered to the frame memory controller 110, where the control data thereof is interpreted. Numerals 103, 104 denote frame memories each constituted by a dual-port memory circuit element capable of storing at least one page of image data. In accordance with control executed by the frame memory controller 110, image data is read out of either one of these frame memories, delivered to a read bus 108 and displayed on a monitor 106, during which time image data is written in the other frame memory via a write bus 107. By transferring the read image data from the read bus 108 to the write bus 107, the content of one frame memory can be transferred to the other frame memory (i.e., frame transfer can be carried out).

A D/A converter 105 converts the digital image data read out of frame memory 103 or 104 into an analog signal and outputs the analog signal to the monitor 106, whereby the content of the read frame memory can be displayed. The control information from the receiver 101 enters the frame memory controller 110, which designates the frame memory to undergo reading or writing. The frame memory controller 110 includes a CPU 111 such as a microprocessor, a ROM 112 for storing the control program of the CPU 111 as well as various data, and a RAM 113 used as the working area of the CPU 111.

Figure 2:
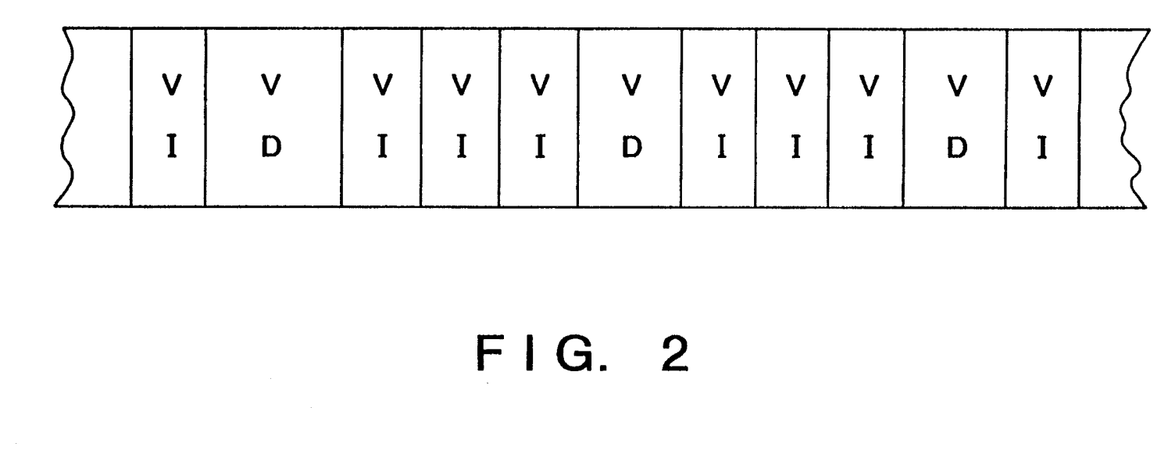
FIG. 2 is a diagram showing an example of the format of data received by the still-picture playback apparatus of the embodiment.

FIG. 2 is a diagram illustrating an example of the structure of the image data received by the receiver 101. VI denotes the image control data, and VD represents the coded image data. The coded image data VD is delivered from the receiver 101 to the coded image decoder 102, where the data is expanded and restored (decoded) to the original image data. The image control data VI, on the other hand, is image control data which indicates whether the arriving image data is partial data or ordinary full-frame data, or includes a frame-display or frame-changeover control command and, when the image data is a partial image, includes an address at which the partial image is displayed. The image control data VI is sent to the frame memory controller 110, where it is interpreted. Here a frame changeover, a data transfer between frame memories or display control is executed, as will be described later.

Figure 3:
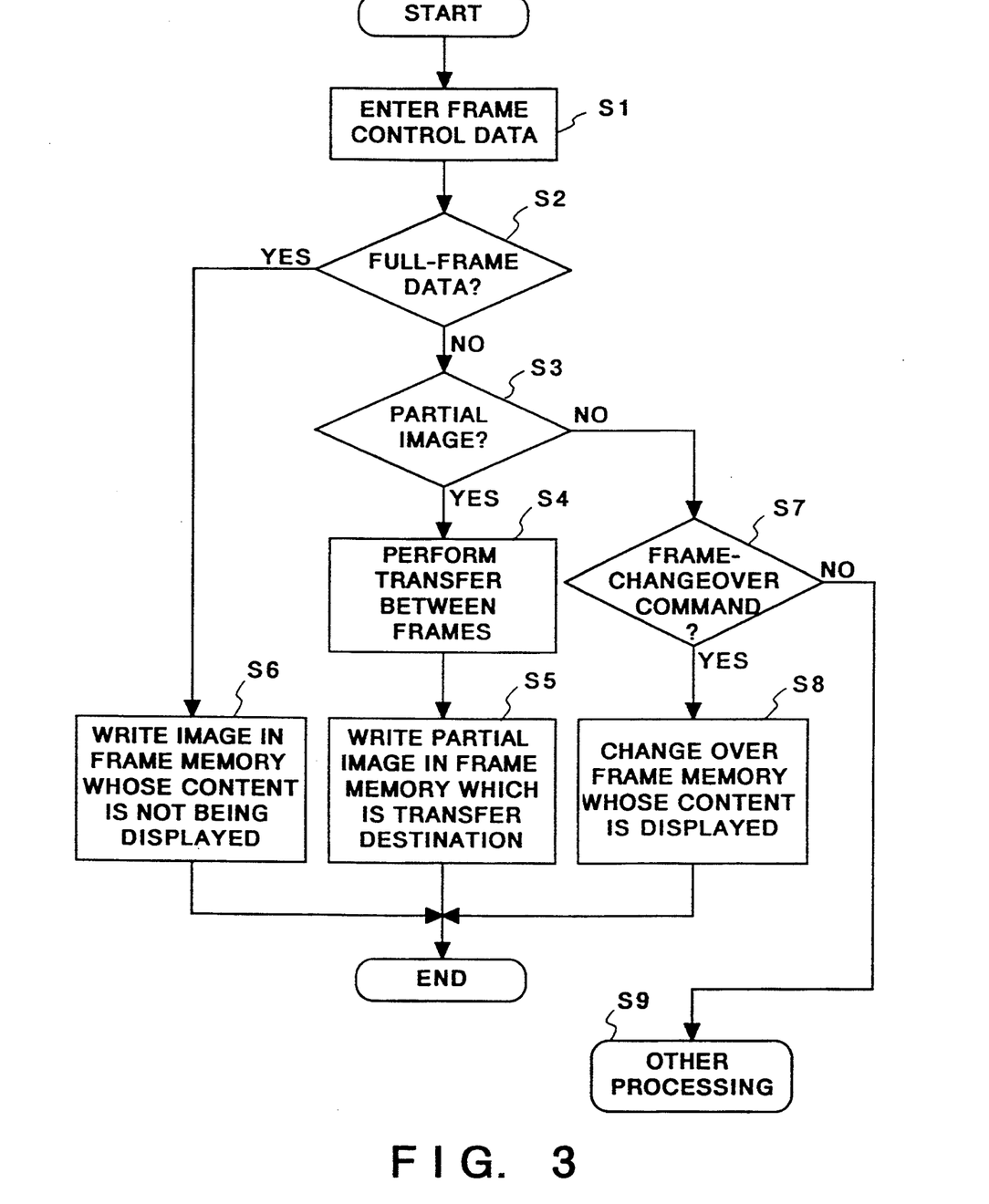
FIG. 3 is a flowchart illustrating control for receiving image data in the still-picture playback apparatus of the embodiment.

FIG. 3 is a flowchart showing image-display control processing in the still-picture playback apparatus of the embodiment. The control program for executing this processing is stored in the ROM 112.

This processing starts in response to reception of the image data, shown in FIG. 2, by the receiver 101. Step S1 of the flowchart calls for entry of the frame control data from the receiver 101. Next, it is determined at step S2 whether this data is full-frame control data. If the answer is YES, then the program proceeds to step S6, at which the received and expanded image data is stored in the frame memory (e.g., frame memory 103) whose content is not currently being displayed.

If it is found at step S2 that the control data is not indicative of full-frame data, then the program proceeds to step S3, at which it is determined whether the control data is indicative of a partial image. If the answer at this step is YES, the program proceeds from step S3 to step S4. If the content of frame memory 103, for example, is currently being displayed, then the content of this frame memory is transferred to frame memory 104 at step S4. Next, at step S5, the received partial image is written in frame memory 104, which is the transfer destination, at an address designated by the frame control data VI. It should be noted that the this received partial image is written in the frame memory upon being expanded by the compressed data decoder 102, just as in the case of ordinary full-frame data.

If it is found at step S3 that the data is not partial image data, the program proceeds to step S7, at which it is determined whether the data is a frame changeover command. If the data is a frame changeover command, the program proceeds to step S8. If the content of frame memory 103, for example, is currently being displayed, then the content of frame memory 104 is read out on read bus 108 and is outputted upon being converted into an analog signal by the D/A converter 105. As a result, the frame is changed over from the content of frame memory 103 to the content of frame memory 104 and is displayed on the monitor 106. If it is determined at step S7 that the data is not the frame changeover command, then the program proceeds to step S9, at which processing corresponding to this frame control command is executed.

Figure 4:
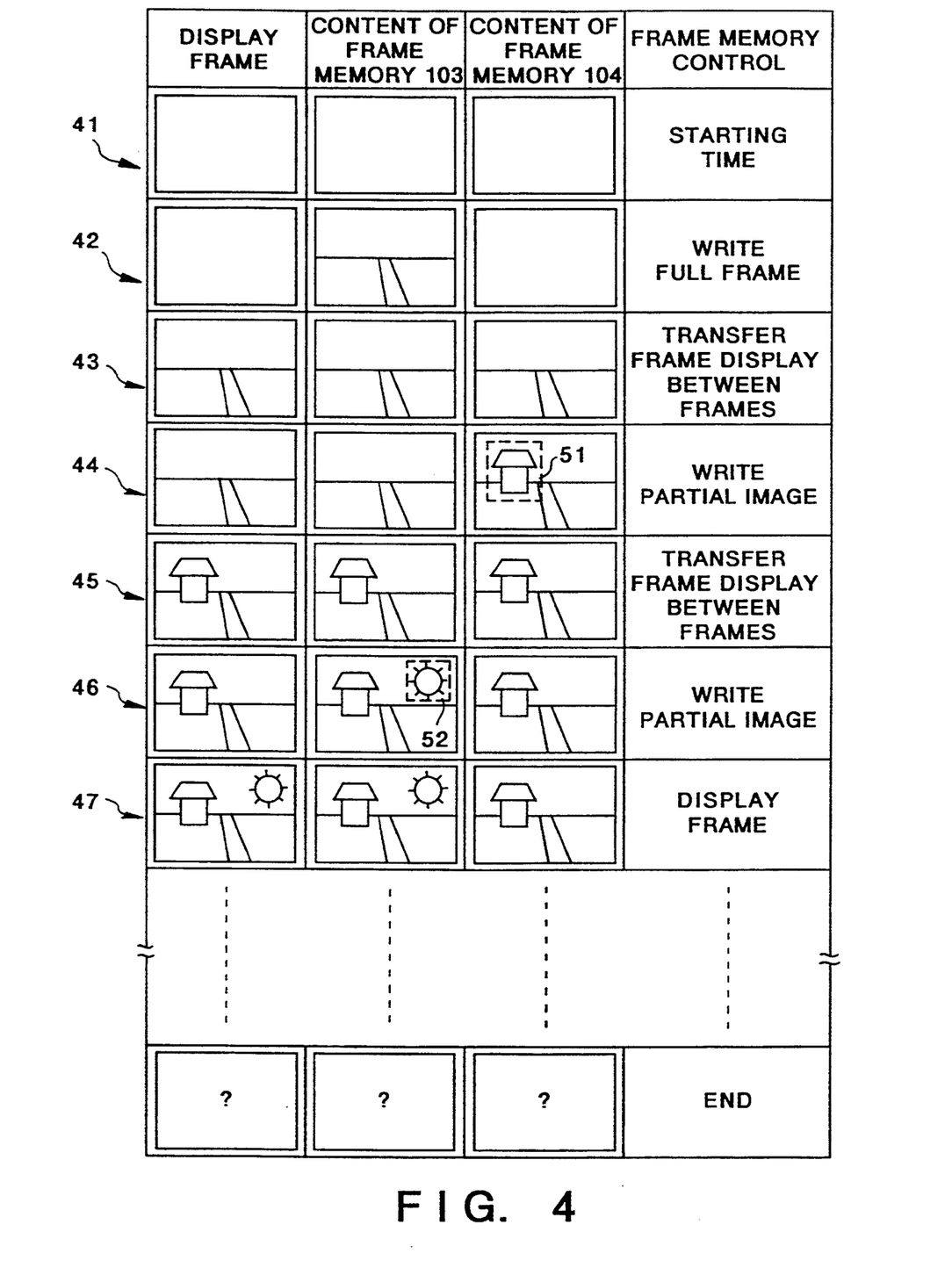
FIG. 4 is a diagram showing an example of the display of a received image and the contents of frame memories in the still-picture playback apparatus of the embodiment.

FIG. 4 is a diagram showing the contents of the frame memories and examples of displays in accordance with the frame control processing executed based upon the flowchart of FIG. 3.

In FIG. 4, numeral 41 is a diagram showing a display screen of the monitor 106 prior to the start of the reception operation, as well as the contents of the frame memories 103 and 104. Numeral 42 is a diagram illustrating a state in which, by way of example, the full-frame data is received and the received image data is written in frame memory 103 at steps S2 and S6 of FIG. 3. Numeral 43 is a diagram illustrating a state in which the content of the frame memory is read out and displayed, control data indicative of, e.g., a partial image at step S3 of FIG. 3 is received, and image data is transferred from frame memory 103 to frame memory 104. Numeral 44 illustrates a state in which newly received partial image data 51 is written in the frame memory 104 not currently being used in presenting a display (step S5).

Numeral 45 illustrates a state in which a frame changeover command is inputted to display the content of frame memory 104 instead of frame memory 103, after which a partial image is received, whereby the content of frame memory 104 currently used in presenting the display is transferred to the frame memory 103. As a result, the contents of frame memories 103, 104 are the same and the content of frame memory 104 is displayed on monitor 106.

Numeral 46 illustrates a state in which the next item of partial image data 52 is received. This received partial image data 52 is written in the frame memory 103, which is not currently being used in presenting a display. Numeral 47 is a diagram in which, in response to entry of a frame changeover command in the state shown in diagram 46, the display is changed over from the content of frame memory 104, which up until now has been displaying its content, to the content of frame memory 103, and this content is displayed on monitor 106.

In accordance with the embodiment described above, image control data for controlling the frame memories is attached to the transmission data, and the image-data portion constituting the moving-picture portion of one frame is transmitted and displayed as a partial image, thereby making it possible to produce a partial moving picture while playing back a still picture.

Figure 6:
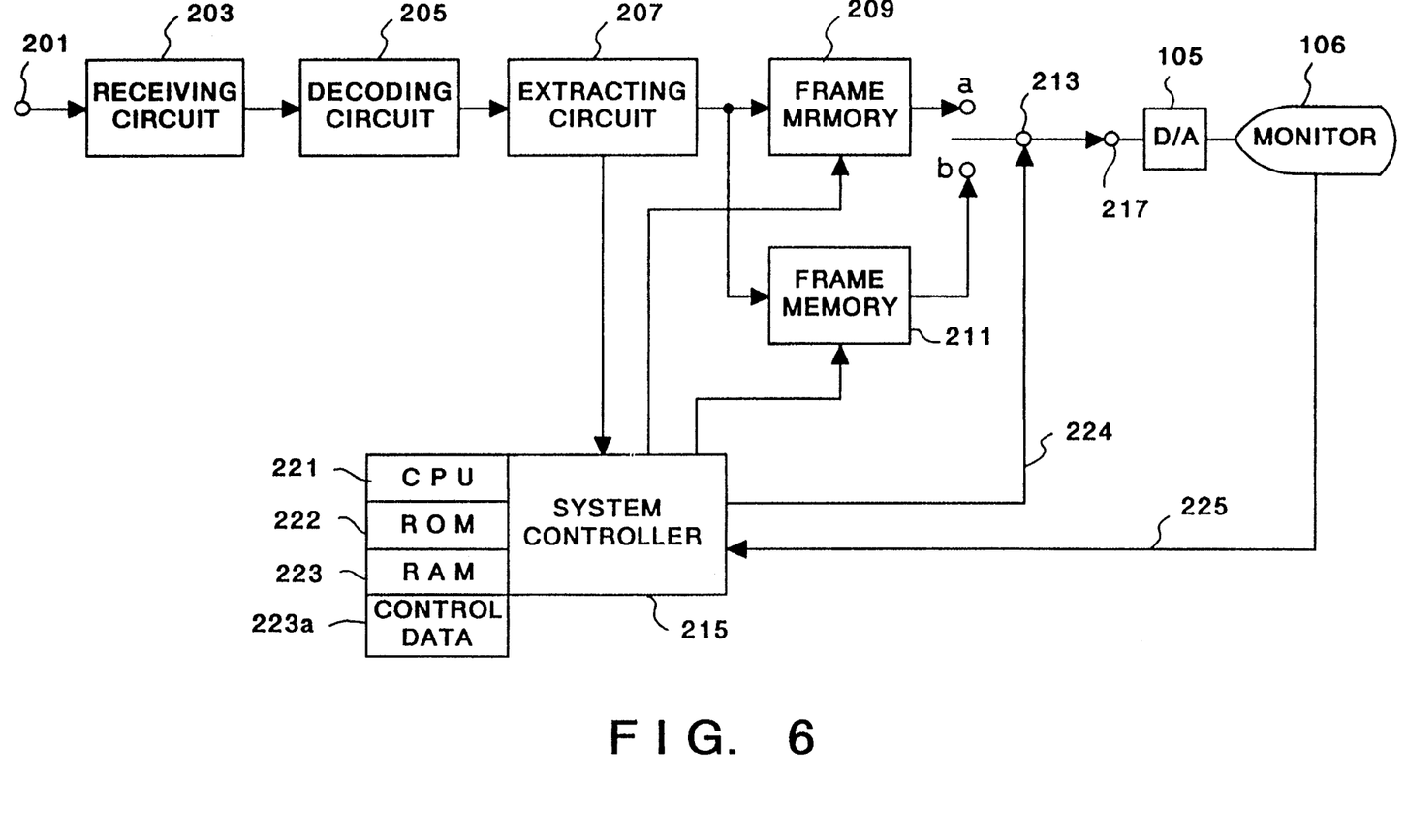
FIG. 6 is a block diagram illustrating the simplified construction of a still-picture playback apparatus according to another embodiment of the present invention.

FIG. 6 is a block diagram illustrating the simplified construction of a still-picture broadcast receiving apparatus according to another embodiment of the present invention.

As shown in FIG. 6, the apparatus includes an input terminal 201 at which broadcast radio waves received by an antenna enter. These radio waves including compressed still-picture signal are applied to a receiving circuit 203 which, on the bases of the radiowave signal, converts this signal into an electric signal of a compressed still-picture outputted to a decoder circuit 205. The latter decodes this coded (compressed) still-picture signal and delivers it to an extracting circuit 207 as the original still-picture data.

The extracting circuit 207 extracts the frame control signal (e.g., signal VI in FIG. 2) attached to the broadcast signal and outputs the frame control signal to a system controller 215. The frame control data includes display changeover information executed by various systems. This information is for making a changeover from one frame to the next by ordinary cut changeover, by wipe, dissolve or scrolling, or by partial rewrite. The frame control information also includes information stipulating frame display time, or address information of a partially rewritten image. By using the items of frame control data, the frame display method can be made varicolored and a moving-picture display can be presented even with still pictures.

Frame memories 209, 211 each store at least one frame of decoded digital image data. Image data constituting a background picture is stored in the frame memory 209, and plural items of image data constituting a moving-picture portion in a frame is stored in the frame memory 211. A system controller 215 for controlling the overall apparatus includes a CPU 221, a ROM 222 storing the control program of the CPU 221 as well as various data, and a RAM 223 used as the working area of the CPU 221. The RAM 223 has a control-data area 223a for storing frame control data extracted by the extracting circuit 207.

A switch 213 is changed over to terminal a or terminal b by a changeover signal 224 outputted by the system controller 215 so that the background picture of frame memory 209 or the moving-picture portion of frame memory 211 is delivered to an output terminal 217. The changeover of switch 213 by the changeover signal 224 is carried out based upon the frame control data stored in the control-data area 223a. The output terminal 213 is connected to the D/A converter 105. A raster-scan signal outputted by the D/A converter 105 enters the television monitor 106, which is capable of displaying the image. A display synchronizing signal 225 outputted by the monitor 106 is composed of horizontal and vertical synchronizing signals, etc. The display synchronizing signal 225 enters the system controller 215, which outputs the content of frame memory 209 or 211 in synchronism with the synchronizing signal.

Figure 7:
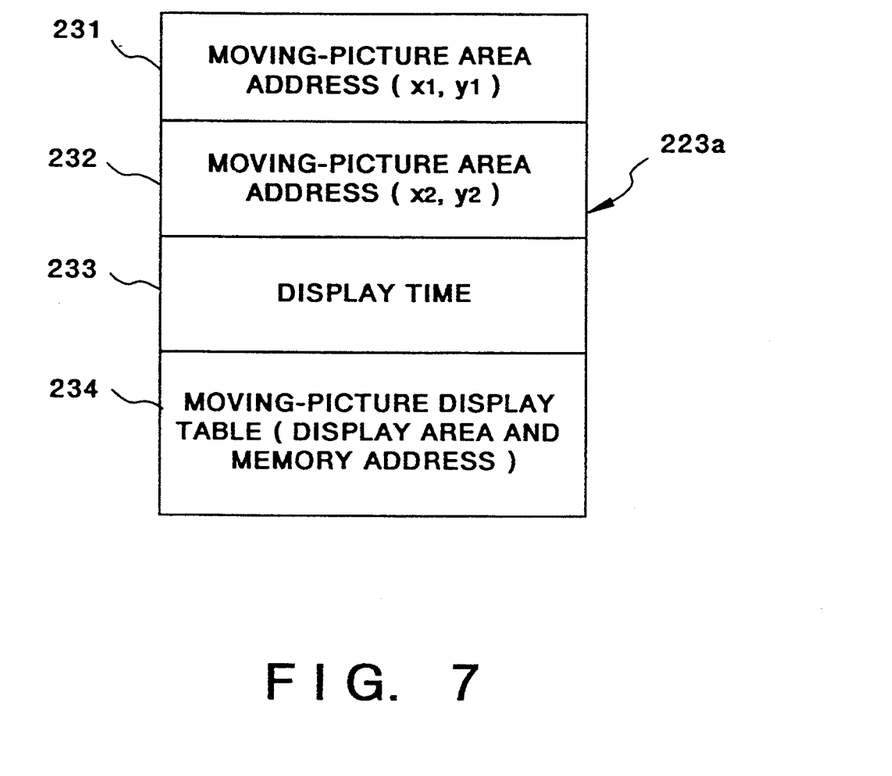
FIG. 7 is a diagram showing an example of the structure of data stored in a frame control-data area.

FIG. 7 is a diagram illustrating the structure of data in the control-data area 223a. Numerals 231, 232 indicate display addresses of the moving-picture portion (rectangular). Specifically, numeral 231 denotes the address $(x_1, y_1)$ at the upper left corner of a rectangular display area, and numeral 232 denotes the address $(x_2, y_2)$ at the lower right corner of the rectangular display area. Numeral 233 denotes the display time of one moving picture in the moving-picture frame. The display content and display position of the moving-picture portion is updated in accordance with the display time. Numeral 234 indicates a moving-picture display table. This table 234 stores information which moving-picture information stored in frame memory 211 is being read out and displayed, in correlation with the display addresses ($x_1,y_1$) ($x_2,y_2$) at which the moving-picture portion is displayed.

The operation of the system controller 215 based upon the foregoing arrangement will now be described in detail with reference to the flowchart of FIG. 8 and an example of image data shown in FIG. 9.

Figure 8A:
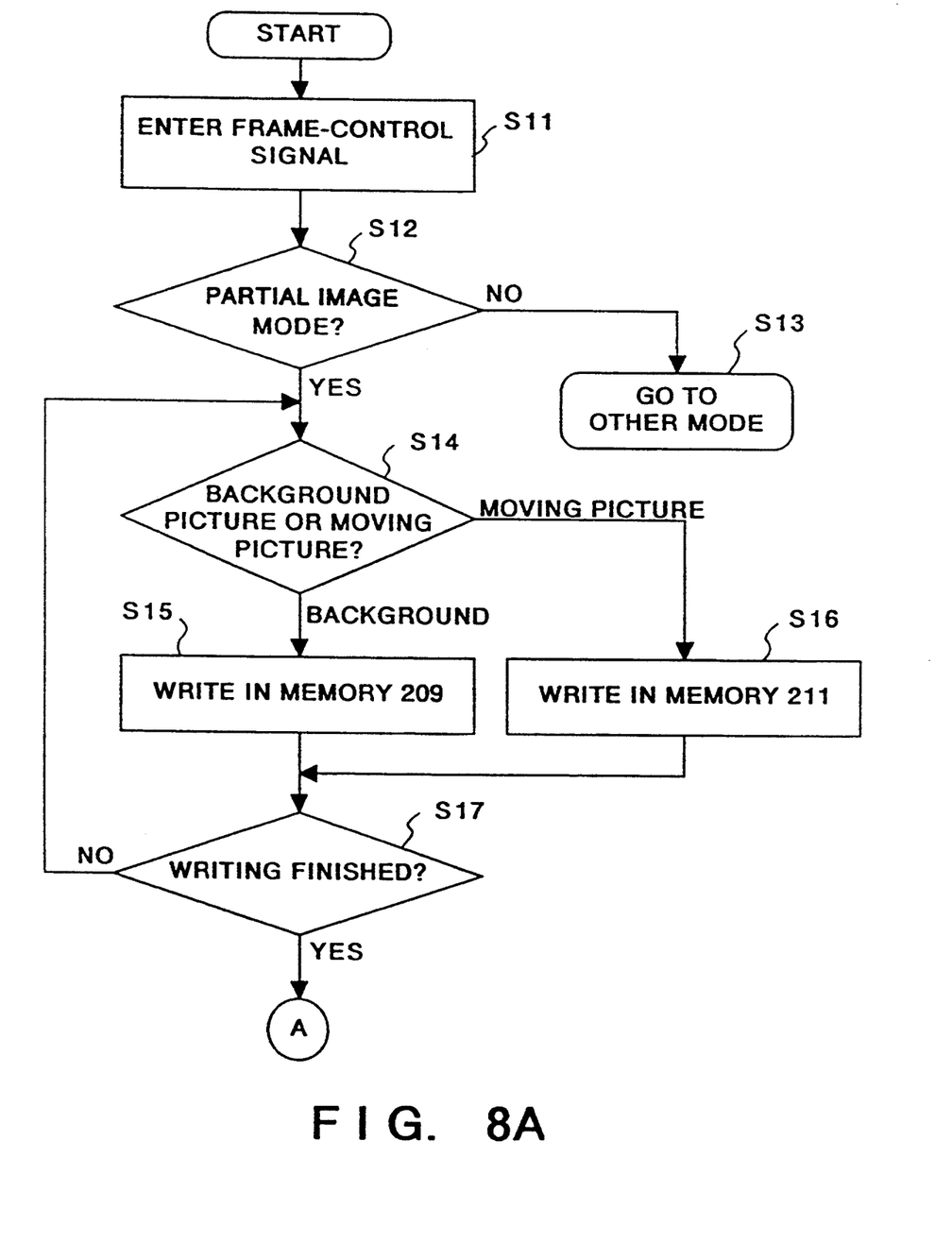
FIG. 8(A) and 8(B) is a flowchart showing processing for outputting a received image in a still-picture playback apparatus according to another embodiment of the present invention.
Figure 8B:
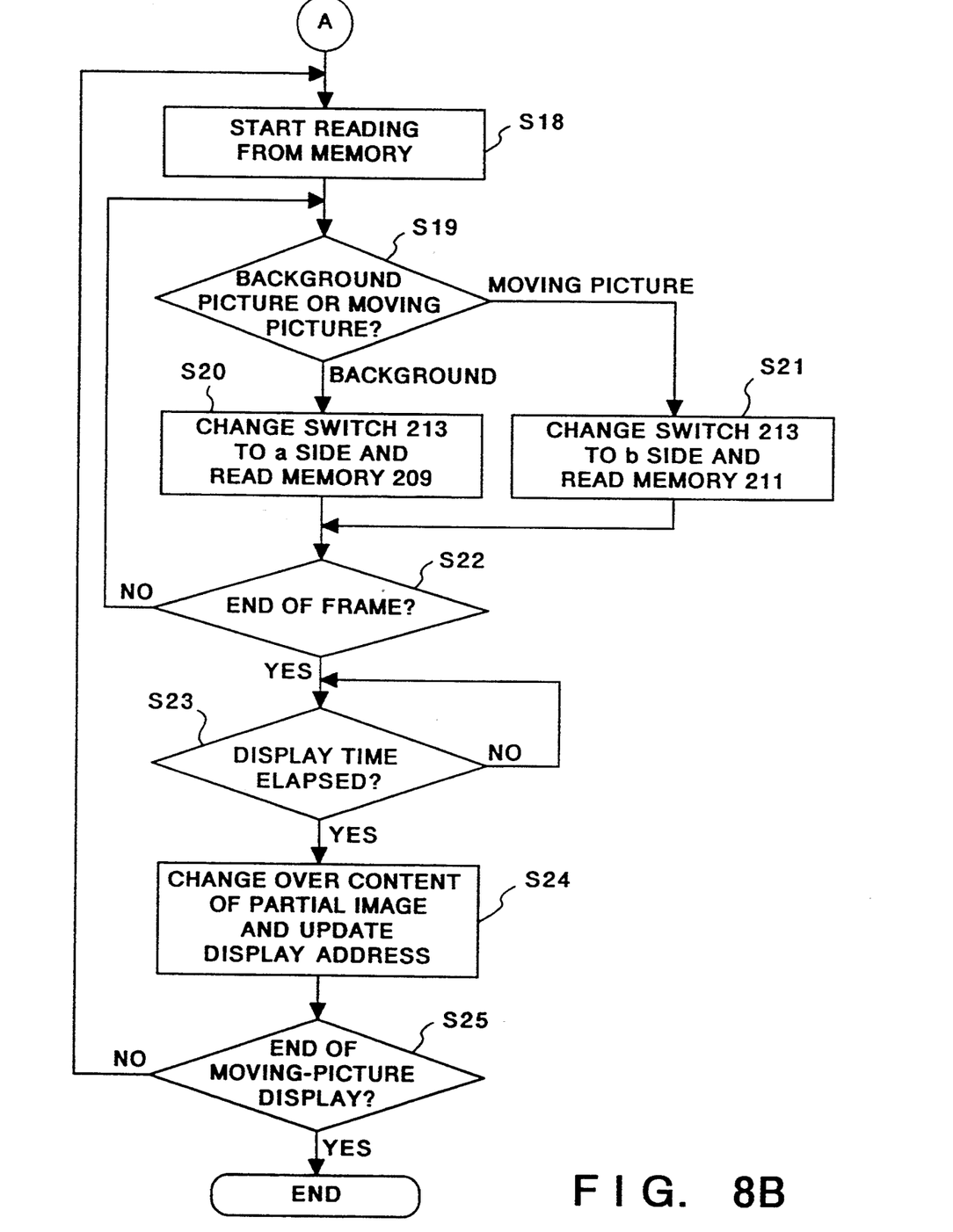

FIG. 8(A) and 8(B) is a flowchart illustrating the processing for receiving and outputting an image signal, which processing is executed by the system controller 215 of the still-picture broadcast receiving apparatus according to this embodiment. The control program for executing this processing is stored in the ROM 222.

This processing starts once radio waves have been received through the receiving circuit 203 and decoded into the original image data by the decoding circuit 205. It is determined at step S11 whether the prevailing mode is a partial moving-picture mode. If the picture is not a moving picture, e.g., if it is a still picture, then the program proceeds to step S13 to effect a transition to processing suited to this mode.

If the mode is found to be the partial moving-picture mode at step S12, the program proceeds to step S14, where it is determined whether the inputted image data is indicative of a background picture or moving picture. If the data indicates a background picture, the program proceeds to step S15, at which the background-picture data is written in frame memory 209. On the other hand, if it is found at step S14 that the data is indicative of a moving picture, then the program proceeds to step S16, at which the moving-picture data is written in frame memory 211. If the writing of the data in frame memory 209 or 211 ends at step S17, meaning that one frame of image data has been written in either of these frame memories, the program proceeds from step S17 to step S18 in FIG. 8(B). If the writing operation has not ended, however, the program returns to step S14 and the write processing described above is executed.

In FIG. 8(B), when one frame of image data has thus been stored in frame memories 209, 211, reading of the image data from frame memory 209 or 211 is started. Next, the program proceeds to step S19. Here, based upon the scanning line and scanning position of the image outputted from output terminal 217, it is determined whether this image, which is outputted from output terminal 217 based upon the display address of the moving-picture area stored in the frame control-data area 223a, is a background picture or moving picture. It should be noted that a display unit such as a television monitor is connected to the output terminal 217 via the D/A converter 105. The image data is read out sequentially from frame memory 209 or 211 in the raster scanning direction in synchronism with the display scanning of the monitor 106.

When the image data is determined to be a background picture, the program proceeds to step S20, at which the switch 213 is connected to side a so that the image data, which is indicative of a background picture, is read out of frame memory 209 and delivered as an output. On the other hand, when it is determined that a moving-picture area is being scanned, the program proceeds to step S21, at which the switch 213 is connected to side b so that the moving-picture data is read out of frame memory 211 and delivered as an output. This control of changing the switch 213 is performed in real time while outputting one frame of image data.

It is determined at step S22 whether the output of one frame of image data has ended. If it has not ended, the program returns to step S19, at which the abovedescribed processing is executed. When display of one frame of the image is thus completed, the program proceeds to step S23, at which it is determined whether the time stipulated by the display time 233, which has been stored in the control-data area 233a, has elapsed. If the time has elapsed, the display addresses 231, 232 of the partial moving-picture area are updated, reference is made to the moving-picture display table 234, and the moving-picture data corresponding to these display addresses is read out of the frame memory 211, thereby updating the image data of the moving-picture portion.

Next, it is determined at step S25 whether one predetermined sequence of a moving-picture display has ended. If the display has not ended, the program returns to step S18 to effect a transition to processing for displaying the next frame. If the predetermined moving-picture display has ended, however, all processing is terminated.

FIG. 9 illustrates an example of the image data thus displayed.

Figure 9A:
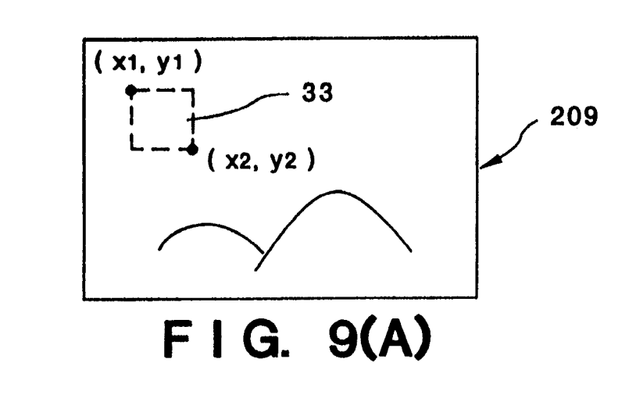
FIGS. 9(A) through (D) are diagrams showing examples of displays of image data outputted by a still-picture playback apparatus according to another embodiment of the present invention.
Figure 9B:
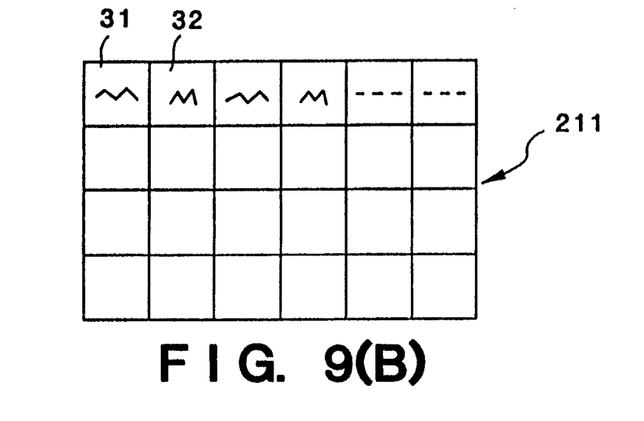
Figure 9C:
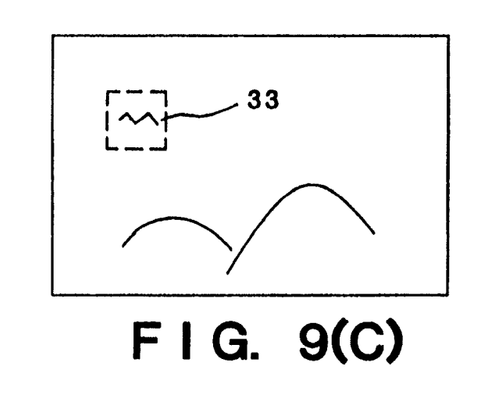
Figure 9D:
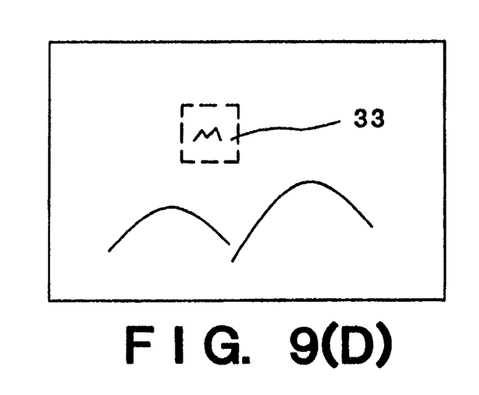

FIG. 9(A) is a diagram depicting an example of a background picture, in which a rectangular area bounded by the dashed line indicates a moving-picture display area in which a moving picture is displayed. FIG. 9(B) is a diagram showing an example of a moving picture stored in the frame memory 211. Here the moving picture is composed of plural items of moving-picture data, as illustrated. FIG. 9(C) is a diagram showing a state in which moving-picture data 31 in FIG. 9(B) has been displayed in moving-picture area 33 of the background picture shown in FIG. 9(A). The outputs from frame memory 209 and 211 are rapidly alternated by the switch 213 so that the moving-pictures are displayed. The moving-picture data in the moving-picture area is displayed in one frame by means of connection the switch 213 to side b. FIG. 9(D) is a diagram illustrating a state in which, when the moving-picture area has been moved rightward in the frame, the moving-picture data 32 is stored in moving-picture area 33 and displayed. It should be noted that the position (address) of the moving-picture display area 33 and the type of moving-picture data displayed in this area are stipulated by the moving-picture display table 234 of the control-data area 233a.

It goes without saying that the position at which a moving-picture portion is inserted can be fixed if desired.

If the moving-picture portion is made small and is composed of a large number of frames, a moving picture equivalent to that of an ordinary moving-picture broadcast or exhibiting even greater movement can be displayed. For example, when an ordinary moving-picture broadcast is composed of 30 frames/sec, forming a partial moving picture of 30 frames takes one second, but a moving picture equivalent to an ordinary moving-picture broadcast can be obtained.

Furthermore, two frame memories are used in the illustrated embodiments. However, if three frame memories are provided, a partial moving picture to be displayed next can be written in one frame memory while a moving picture is displayed by the other two frame memories. This will make it possible to continuously display a partial moving picture by reading these moving-picture memories in alternating fashion.

Thus, in accordance with the embodiments described above, a moving picture can be displayed in partial fashion using a still-picture display.

And, in accordance with the embodiments described above, a moving picture is displayed by rapidly switching the outputs of the frame memory 209 and 211, but this invention is not limited to the embodiment. It will make it possible to display the moving-picture by transferring the moving-picture image of frame memory 211 to the frame memory 209 in a state that the frame memory 209 stores, for example the image shown in FIG. 9(A).

Further, though the embodiments relate to an apparatus in which processing is applied to a broadcast image signal, the present invention is not limited thereto. It goes without saying that the present invention is applicable to other apparatus as well, such as TV telephones.

In this embodiment, CRT or liquid crystal display panel is used as the display means, but other display devices may be used as the display means. Further, the present invention does not always need the display means. If the apparatus in the present invention does not provide display means, the apparatus may display an image on a general display device such as a television.

The present invention can be adapted to a system with a plurality of devices or an apparatus composed of a device. It goes without saying that the present invention is applicable to a system or an apparatus supplied with a software program to perform a function defined by the present invention.

As many apparently widely different embodiments of the present invention can be made without departing from the spirit and scope thereof, it is to be understood that the invention is not limited to the specific embodiments thereof except as defined in the appended claims.

What is claimed is:

1. An image display apparatus comprising:
   first memory means for storing a stationary-picture data portion of inputted image data;
   second memory means for storing a plurality of items of moving-picture data constituting a changing-picture data portion of said inputted image data;
   combining means for controlling each reading time of (i) the stationary-picture data portion from said first memory means and (ii) each of the plurality of items of moving-picture data from said second memory means in accordance with control information inputted together with said image data, and for combining the stationary-picture data portion and each of the plurality of items of moving-picture data; and
   timing means for generating a display time at which each of the plurality of items of moving-picture data is displayed,
   wherein said combining means changes the item of moving-picture data in accordance with the display time generated by said timing means.

2. The apparatus according to claim 1, wherein said control information includes address information designating an address of the changing-picture data portion versus said stationary-picture data, and specifying information specifying any one of the plurality of items of the moving picture data stored in said second memory means in correspondence with said address.

3. The apparatus according to claim 1, further comprising address storing means for storing address information designating a display area of each of the items of moving-picture data in said stationary-picture data, and display means for displaying picture data combined by said combining means,
wherein said display means combines and displays the item of moving-picture data read out of said second memory means with an area of said stationary-picture data designated by address information.

4. The apparatus according to claim 1, in which the imputted image data is coded image data, and the apparatus further comprises decoding means for decoding said coded image data.

5. The image display apparatus according to claim 1, wherein said combining means controls the reading time of each of the items of moving-picture data from the second memory means based on the display timing generated by said timing means.

6. An image display apparatus for displaying received image data, comprising:
   discriminating means for discriminating whether the received image data is stationary-picture data or moving-picture based upon control data contained in the received image data;
   a picture memory for storing received stationary-picture data;
   a moving-picture memory capable of storing plural items of received moving-picture memory data;
   storage means for storing area information relating to the plural items of the moving-picture data versus the stationary-picture data designated by the control data, as well as display time of said plural items of moving-picture data;
   reading means for reading the stationary-picture data of said picture memory designated by the control data as well as the plural items of moving-picture data stored in said moving-picture memory in parallel, in accordance with the area information and display time stored in said storage means; and
   display means for displaying picture data by combining the stationary-picture data with each of the plural items of moving-picture data read out by said reading means.

7. An image display method for receiving, reproducing and displaying received image data, comprising the steps of:
   generating stationary-picture data or moving-picture data based upon control data;
   storing received stationary-picture data in a picture memory and storing received moving picture data in a moving-picture memory; and
   reading and displaying the stationary-picture data of the picture memory designated by the control data as well as the moving-picture data stored in the moving-picture memory in parallel, in accordance with display area information of moving-picture data versus stationary-picture data designated by the control data, and display time of said moving-picture data.

8. An image processing apparatus comprising:
   first memory means for storing a stationary-picture data portion of an inputted image data;
   second memory means for storing a plurality of items of moving-picture data constituting a changing-picture data portion of said inputted image data;
   combining means for controlling each reading time of (i) the stationary-picture data from said first memory means and (ii) each of the items of moving-picture data from said second memory means in accordance with control information inputted together with said image data, and for combining the stationary-picture data portion and each of the items of moving-picture data; and timing means for generating a display time at which each of the items of moving-picture data is displayed, wherein said combining means changes the item of moving-picture data in accordance with the display time generated by said timing means.

9. The image processing apparatus according to claim 8, wherein said combining means controls the reading time of each of the items of moving-picture data from the second memory means based on the display timing generated by said timing means.

10. An image processing apparatus for displaying received image data, comprising:

discriminating means for discriminating whether the received image data is stationary-picture data or moving-picture data based upon the control data contained in the received image data;

a picture memory for storing received stationary-picture data;

a moving-picture memory capable of storing plural items of received moving-picture data;

storage means for storing area information relating to the plural items of moving-picture data versus the stationary-picture data designated by the control data, as well as display time of said plural items of moving-picture data;

reading means for reading the stationary-picture data of said picture memory designated by the control data as well as the plural items of moving-picture data stored in said moving-picture memory in parallel, in accordance with the area information and display time stored in said storage means; and output means for outputting the stationary-picture data and the plural items of moving-picture data read out by said reading means to a display device.

11. An image processing method for receiving, reproducing and displaying received image data, comprising the steps of:

discriminating whether the received image data is stationary-picture data or moving-picture data based upon control data contained in the received image data storing received stationary-picture data in a picture frame memory and storing received moving picture data in a moving-picture memory; and reading and displaying the stationary-picture data of a picture memory designated by the control data as well as the moving-picture data stored in the moving picture memory in parallel, in accordance with display area information of moving-picture data versus stationary-picture data designated by the control data, and display time of said moving-picture data.

12. An image processing apparatus comprising:

first memory means for storing first image data;

second memory means for storing second image data representing a whole image which comprises a plurality of second pictures;

combining means for controlling a reading time of (i) the first image data from said first memory means and (ii) each of the plurality of second pictures of second image data from said second memory means in accordance with predetermined control information, and for sequentially combining the first image data of said first memory means and each of the plurality of second pictures of second image data of said second memory means.

13. The image processing apparatus according to claim 12, further comprising timing means for generating a timing signal, wherein said combining means changes an item of second image data in accordance with the timing signal generated by said timing means.

* * * * *

UNITED STATES PATENT AND TRADEMARK OFFICE
CERTIFICATE OF CORRECTION

PATENT NO.  : 5,353,063          Page 1 of 2
DATED       : October 4, 1994
INVENTOR(S) : YAGISAWA, ET AL.

It is certified that error appears in the above-indentified patent and that said Letters Patent is hereby corrected as shown below:

Title page,
At [56] References Cited

Insert: --Attorney, Agent, or Firm- Fitzpatrick, Cella, Harper & Scinto--.

At [56] U.S. Patent Documents

"Palatnick" should read --Polatnick--.

Drawings:
SHEET 6

Fig. 6, "MRMORY" should read --MEMORY--.

COLUMN 1

Line 24, "presence" should be deleted.

COLUMN 2

Line 23, "prior described" should read --prior art described--.

UNITED STATES PATENT AND TRADEMARK OFFICE
CERTIFICATE OF CORRECTION

PATENT NO. : 5,353,063

DATED : October 4, 1994

INVENTOR(S) : YAGISAWA, ET AL.

It is certified that error appears in the above-indentified patent and that said Letters Patent is hereby corrected as shown below:

COLUMN 6

Line 5, "bases" should read --basis--.

COLUMN 7

Line 68, "abovede-" should read --above-de- --.

Signed and Sealed this

Thirtieth Day of May, 1995

Attest:

BRUCE LEHMAN

Attesting Officer       Commissioner of Patents and Trademarks